Dec. 12, 1933.  J. W. WHITE  1,939,584
AUTOMATIC ADJUSTMENT MEANS FOR VEHICLE BRAKE ACTUATING MECHANISM
Filed April 6, 1931  2 Sheets-Sheet 1
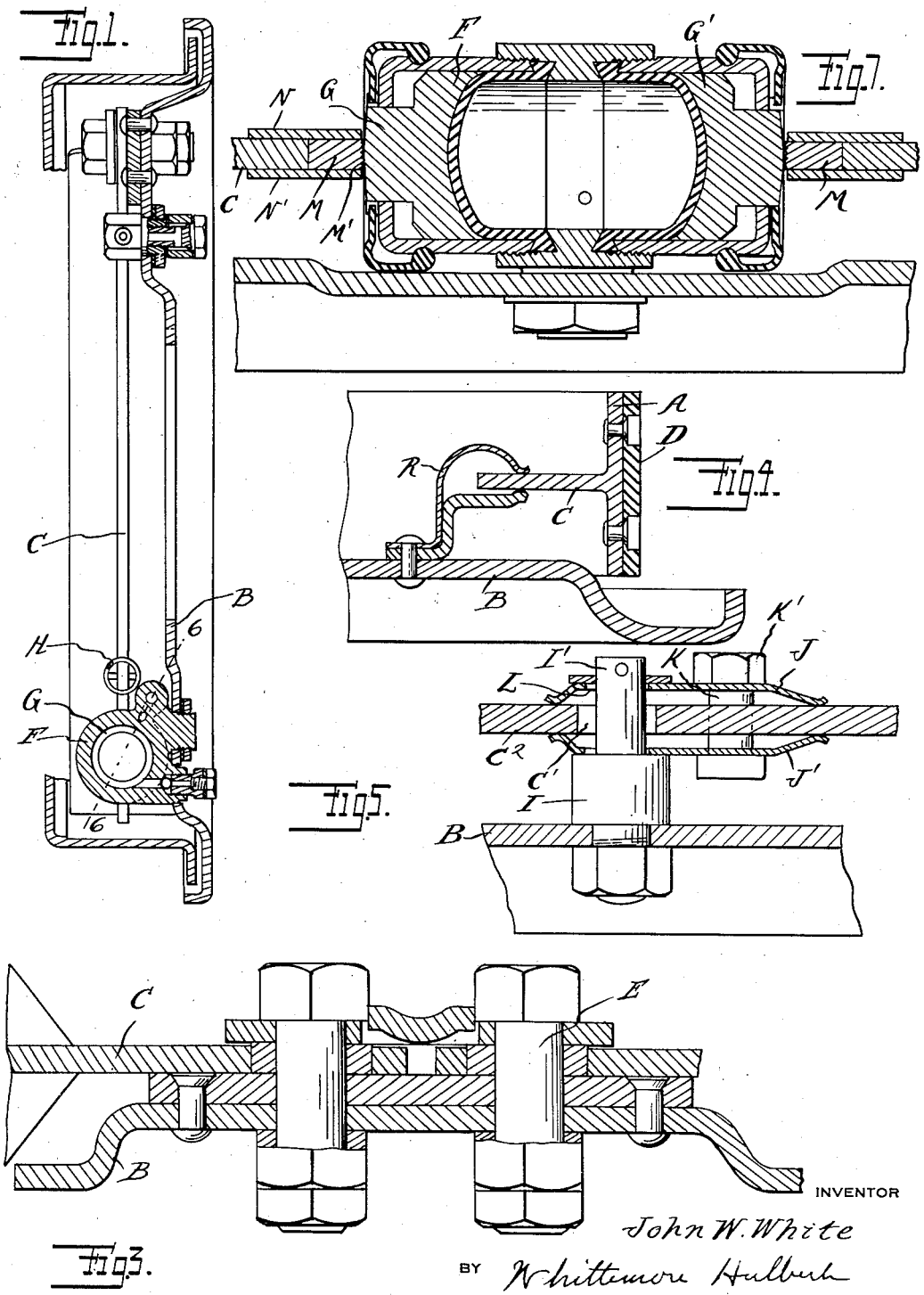

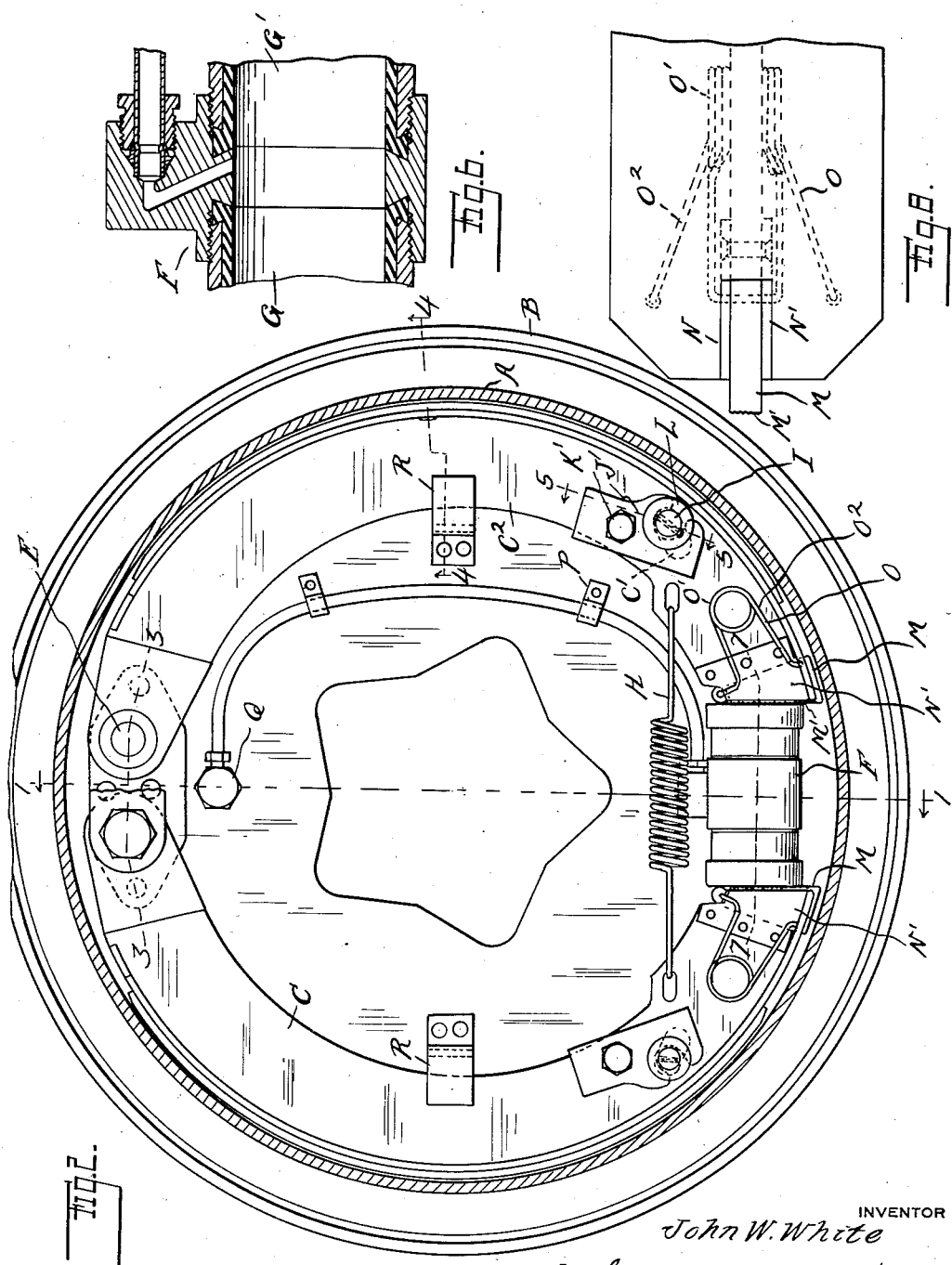

Patented Dec. 12, 1933

1,939,584

UNITED STATES PATENT OFFICE 1,939,584

AUTOMATIC ADJUSTMENT MEANS FOR VEHICLE BRAKE ACTUATING MECHANISM

John William White, Detroit, Mich.

Application April 6, 1931. Serial No. 528,151

9 Claims. (Cl. 188—79.5)

The invention relates to manually operable vehicle brake actuating mechanisms and it is the object of the invention to obtain a construction in which compensation for wear in the brake linings is automatically effected so as to maintain an operative condition throughout the entire life of said lining. More particularly, the invention is applicable to brakes of the internal type in which pivoted brake shoes within a brake drum are actuated oppositely to move their lined peripheral faces into and out of contact with the drum. Such constructions are operated in various ways such as mechanically, hydraulically, etc., but whatever the type of mechanism employed, the prime mover is the brake pedal or other manually operable member moving within predetermined limits. Thus as wear takes place it is necessary to adjust the actuating mechanism so as to be operative within these limits.

With the present invention the retractile movement of the brake shoe is confined within limits which are the minimum required to insure full release of braking contact under all conditions of operation. This correspondingly limits the degree of movement of the brake pedal required for the actuation of the brake. The movement of the shoe into braking contact with the drum is, however, unrestricted and consequently any wear in the lining will be taken up by a slight further movement of the shoe towards the drum. This requires a correspondingly increased movement of the pedal which in time would exceed the permissible limits, but such result is avoided by an automatic take up mechanism between the pedal and the shoe. Thus my improved construction is one in which the movement of the pedal is confined within minimum limits without restricting full braking contact between the shoe and the drum during the entire life of the lining.

As illustrated in the drawings:

Figure 1 is a vertical central section through a hydraulically operated vehicle brake to which my improvements are applied, taken on line 1—1 of Figure 2;

Figure 2 is a sectional side elevation thereof;

Figures 3, 4 and 5 are cross sections respectively on lines 3—3, 4—4 and 5—5 of Figure 2;

Figure 6 is a section on line 6—6 of Figure 1;

Figure 7 is a section on line 7—7 of Figure 2;

Figure 8 is an elevation of one end of the shoe viewed from the peripheral side thereof showing the automatic take-up mechanism.

A is the brake drum, B the stationary head or brake carrier, C the brake shoes within the drum provided with peripheral linings D and pivoted at one end as indicated at E. For reasons hereinafter given, the pivots E are preferably arranged at the top of the drum while the actuating mechanism is placed at the bottom thereof. As shown, this actuating mechanism is a hydraulic unit F which is mounted within the drum between the free ends of the shoes C and which has the oppositely movable plungers G, G' for spreading the shoes to apply the brake. The specific construction of this hydraulic unit is not a part of the present invention and therefore will not be described in detail.

As has been stated, the retractile movement of the shoes C is confined within the minimum limits required for fully releasing the brake and for compensating for expansion or contraction in the parts due to temperature changes. To accomplish this result without restricting movement of the shoes towards the drum to compensate for wear in the linings I employ a yieldable stop for the shoe and a retracting spring such as H of insufficient tension to overcome the resistance of said stop. As specifically shown, the stop is formed by a stud I mounted on the brake head B and projecting through a slot C' in the web C² of the brake shoe. Frictionally mounted upon this web C² and preferably upon opposite sides thereof, are the spring plates J J' which pivotally engage a bolt or pin K passing through aligned apertures in the web C² and said plates. These plates are also preferably outwardly bowed and are placed under tension by a clamping nut K' engaging the bolt K. The plates J J' are also apertured or slotted at L to receive a reduced end portion I' of the stud I with sufficient clearance for the required normal movement of the shoe. If, however, the movement of the shoe is in excess of that permitted by the clearance in the aperture L, the plates J will be turned slightly upon the pivot K against the frictional resistance imposed by the bearing of said plates on the web. Thus the retractile movement under the actuation of the spring H will not exceed the limit of the clearance of the stud I' within the slot L, but the movement of the shoe towards the drum under the actuation of the hydraulic motor will overcome such frictional resistance and will always move the shoe into full frictional engagement with the drum. It is obvious that various modifications in the construction of this yieldable stop may be employed without alteration in the general function, which is to limit the retractile movement of the shoe without limiting its outward movement into frictional contact with the drum.

The hydraulic unit F has merely a push bearing against the free ends of the shoes C and therefore has no power to retract the same. As a consequence, whenever the outward movement of the plungers G and G' in applying the brake exceeds the limit of retractile movement of the shoe the return movement of the plungers will tend to separate the same from the shoes. I make use of this lost motion to effect the automatic adjustment preferably by the following construction:

M is a wedge member which is interposed between the end of the web $C^2$ of the shoe and the plunger G of the hydraulic unit. This wedge is guided by a slotted bearing preferably formed by plates N and N' riveted to opposite sides of the web $C^2$ and projecting to overlap the wedge. O is a spring for urging the wedge in a direction to take up lost motion between the shoe and the plunger, said spring being shown as a wire loop passing through an aperture in the small end of the wedge and having coils O' on opposite sides of the web terminating in divergent arms $O^2$ which are anchored in recesses in the peripheral flange of the shoe. The tension of the springs O is only sufficient to compensate for any outward thrust upon the wedge resulting from the reaction of the spring H in retracting the shoes. To avoid any tendency for the wedges M to creep due to vibration in the parts when the vehicle is in motion, I preferably roughen or serrate one or both edges of the wedge as indicated at M' and harden the surface so that it will bite or cut into the surface in engagement therewith. I have further found that by arranging the pivots E for the shoes at the top of the brake and placing the hydraulic unit at the bottom where the large ends of the wedges are pointing downward, this will avoid any danger of an automatic inward movement of the wedge due to vibration.

The hydraulic unit F may be connected with any suitable master cylinder which is actuated by the brake pedal in any suitable way and I believe it unnecessary to describe such construction. However, the conduit which supplies the fluid to the unit F may be conveniently arranged within the drum as shown, being secured by clips P and being connected at its upper end to a fitting Q which passes out through the head B and is connected to the external system. Anti-rattling spring clips R may also be applied to the web $C^2$ of the brake shoes at various points, but these do not materially resist movement of the shoes.

From the description above given it is believed that the operation of the brake will be fully understood. In brief, whenever the hydraulic unit F is energized, the shoes will be spread and forced into frictional contact with the drum, the degree of friction being dependent upon the pressure of the fluid which in turn is dependent upon the pressure applied to the actuating pedal (not shown). When pressure is released the spring H will retract the shoes but only within the limits of the lost motion of the stud I' in the slot L. As the lining wears the outward movement of the shoe is slightly increased but the amount of increase at any one time is so small as to not materially increase the degree of movement of the actuating brake pedal. In the return movement any lost motion between the plunger G' and the wedge M is immediately taken up by an inward movement of the wedge under the actuation of the spring O. Thus the amount of movement required for the actuating brake pedal is so restricted as to permit of a high ratio of power so as to diminish the effort on the part of the operator.

What I claim as my invention is:

1 The combination with a brake drum, of a brake shoe therein, a reciprocatory actuating member in alignment with the end of said shoe, a member intermediate the end of said shoe and said reciprocatory member having a face for contacting with the latter but unattached thereto, resilient means for retracting said shoe, means for limiting the retractile movement of said shoe and means operating upon a retractile movement of said reciprocatory member which is an excess of the retractile movement of said shoe for adjusting said intermediate member to take up the lost motion therebetween.

2. The combination with a brake drum, of a pair of brake shoes therein engaging opposite sides of the drum with a space between the actuating ends thereof, actuating means located in the space between the ends of said shoes including oppositely moving rectilinearly reciprocatory members, a member intermediate the end of each shoe and the adjacent reciprocatory member and provided with a bearing face for contacting with but unattached to the latter, resilient means for retracting said shoes, means for limiting the retractile movement of each shoe, and means operating upon the retractile movement of the reciprocatory members which is in excess of the retractile movement of said shoes for adjusting said intermediate members to take up the lost motion.

3. The combination with a brake drum, of a brake shoe therein provided with a peripheral lining for contacting with the inner face of said drum, a reciprocatory actuating member in alignment with the end of said shoe, resilient means for retracting said shoe, means automatically adjusted by any excess movement of said shoe into braking contact with said drum occasioned by wear in said lining for limiting the retractile movement of said shoe to a predetermined space between said drum and said lining and means operating upon a retractile movement of said actuating member in excess of the retractile movement of said shoe for taking up lost motion between the end of said shoe and said reciprocatory member.

4. The combination with a brake drum, of a brake shoe therein, a reciprocatory actuating member in alignment with the end of said shoe, a wedge member between the end of said shoe and said reciprocatory member, means for retracting said shoe, means for limiting the retractile movement of said shoe to a predetermined space between the braking face of said shoe and said drum, and means for actuating said wedge to take up any lost motion between the same and said actuating member.

5. The combination with a brake drum, of a brake shoe therein provided with a peripheral lining for contacting with the inner face of the drum, a reciprocatory actuating member in alignment with the end of said shoe, resilient means for retracting said shoe, means for limiting the retractile movement of said shoe to a predetermined space between the face of said lining and said drum, irrespective of wear in the lining, a wedge between the end of said shoe and said reciprocatory member, and resilient means for actuating said wedge to take up lost motion between the same and said actuating member.

6. The combination with a brake drum, of a brake shoe therein provided with a peripheral lining for contacting with the inner face of the drum, a reciprocatory actuating member in alignment with the end of said shoe, resilient means for retracting said shoe, means for limiting the retractile movement of said shoe to a predetermined space between the face of said lining and said drum irrespective of wear in the lining, a wedge between the end of said shoe and said reciprocatory member having a serrated hardened edge for biting in to the bearing surface of one of said members, and resilient means for actuating said wedge to take up lost motion between the same and said actuating member.

7. The combination with a brake drum, of a brake shoe therein provided with a web parallel to the plane of the drum, a peripheral flange and a lining on said peripheral flange for contacting with the inner face of said drum, resilient means for retracting said shoe and means for limiting the retractile movement of said shoe by said resilient means comprising an anchor pin extending through a clearance aperture in said web, a bowed spring plate having a predetermined restricted aperture for said anchor pin and clamping means for said bowed anchor plate upon said web adapted to develop a predetermined frictional resistance to relative movement thereof.

8. The combination with a brake drum, of a brake shoe therein provided with a web parallel to the plane of the drum, a peripheral flange and a lining on said peripheral flange for contacting with the inner face of said drum, resilient means for retracting said shoe and means for limiting the retractile movement of said shoe by said resilient means comprising an anchor pin extending through a clearance aperture in said web, bowed spring plates on opposite sides of said web and each provided with an aperture for said pin having a predetermined limited clearance thereon and clamping means for said bowed spring plates against said web adapted to develop a predetermined frictional resistance to relative movement of said plates and web.

9. The combination with a brake drum, of a brake shoe therein provided with a web parallel to the plane of the drum, a peripheral flange and a lining on said peripheral flange for contacting with the inner face of said drum, resilient means for retracting said shoe and means for limiting the retractile movement of said shoe by said resilient means comprising an anchor pin extending through a clearance aperture in said web, a pair of bowed spring plates on opposite sides of said web, each being provided with an aperture for said pin having a predetermined limited clearance thereon and a bolt for securing said bowed plates to said web under a predetermined tension for frictionally resisting relative movement between said plates and web, said clamping bolt forming a pivot around which said plates can move when actuated by a force in excess of said frictional resistance.

JOHN WILLIAM WHITE.